(12) United States Patent
Pearson

(10) Patent No.: US 7,659,849 B2
(45) Date of Patent: Feb. 9, 2010

(54) FREQUENCY SCANNING ANTENNA

(75) Inventor: Graham Pearson, Essex (GB)

(73) Assignee: Plextek Limited, Essex (GB)

( * ) Notice: Subject to any disclaimer, the term of this patent is extended or adjusted under 35 U.S.C. 154(b) by 0 days.

(21) Appl. No.: 12/123,161

(22) Filed: May 19, 2008

(65) Prior Publication Data
US 2008/0284652 A1 Nov. 20, 2008

Related U.S. Application Data

(63) Continuation of application No. PCT/EP2006/068732, filed on Nov. 21, 2006.

(30) Foreign Application Priority Data

| Nov. 21, 2005 | (GB) | ................................. 0523676.5 |
| Jan. 13, 2006 | (GB) | ................................. 0600685.2 |

(51) Int. Cl.
H01Q 3/22 (2006.01)
(52) U.S. Cl. ..................................................... 342/375
(58) Field of Classification Search .................. 342/375
See application file for complete search history.

(56) References Cited

U.S. PATENT DOCUMENTS

| 3,290,688 A | | 12/1966 | Kraus |
| 4,001,837 A | * | 1/1977 | Regenos et al. ............. 343/815 |
| 4,376,938 A | | 3/1983 | Toth et al. |
| 4,667,201 A | * | 5/1987 | Itoh ............................ 342/371 |

(Continued)

FOREIGN PATENT DOCUMENTS

| GB | 1113647 | 5/1968 |

(Continued)

OTHER PUBLICATIONS

Tekin et al., "Simultaneous Frequency and Direction Finding Technique Using Frequency Scanning Antenna," Proceedings of the European Microwave Conference. Espoo, Finland, 1:654-658, 1992.
ISR from PCT/EP2006/068732, mailed on May 2, 2007.
UK Search Report from GB0600685.2, mail date not provided.

*Primary Examiner*—Gregory C Issing
(74) *Attorney, Agent, or Firm*—BainwoodHuang

(57) ABSTRACT

Embodiments of the invention are concerned with frequency scanning antennas for transceiving radio frequency energy for use in detecting and monitoring ground-based targets.

In one arrangement the frequency scanning antenna is embodied as a structure that is capable of steering a radio frequency beam to a plurality of different angles about the antenna structure: the antenna structure comprises at least two array antennas and a controller for controlling input of energy to the two array antennas, and the array antennas are disposed within the antenna structure such that the antenna structure is capable of steering a beam to a first angle using one of said two array antennas and of steering a beam to a second angle, different to said first angle, using the other of said two array antennas.

Thus in embodiments of the invention two or more array antennas are arranged to form an antenna structure, and the feed to a respective antenna array of the antenna structure is coordinated so that individual scan areas can be combined to generate an increased overall scan region.

24 Claims, 8 Drawing Sheets

View on end A-A

U.S. PATENT DOCUMENTS

| | | |
|---|---|---|
| 4,864,308 A | 9/1989 | Raab et al. |
| 4,864,309 A | 9/1989 | Wiley et al. |
| 4,868,574 A * | 9/1989 | Raab ............................ 342/81 |
| 5,459,474 A | 10/1995 | Mattioli et al. |
| 5,724,044 A | 3/1998 | Tanaka |
| 5,765,098 A | 6/1998 | Bella |
| 5,969,689 A | 10/1999 | Martek et al. |
| 6,111,542 A * | 8/2000 | Day et al. .................... 342/359 |
| 6,448,930 B1 * | 9/2002 | Judd .................... 343/700 MS |

FOREIGN PATENT DOCUMENTS

| | | |
|---|---|---|
| GB | 1220395 | 1/1971 |
| GB | 1300051 | 12/1972 |
| WO | WO 2004/046752 | 6/2004 |

* cited by examiner

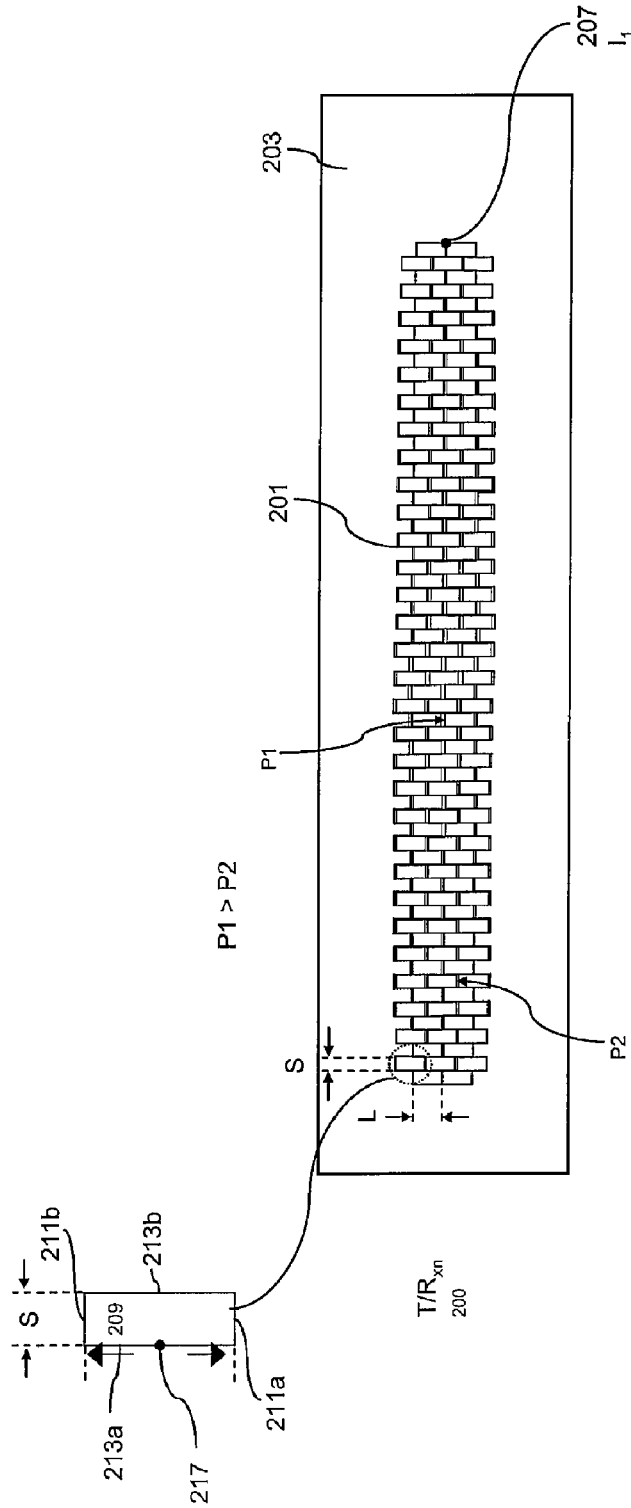
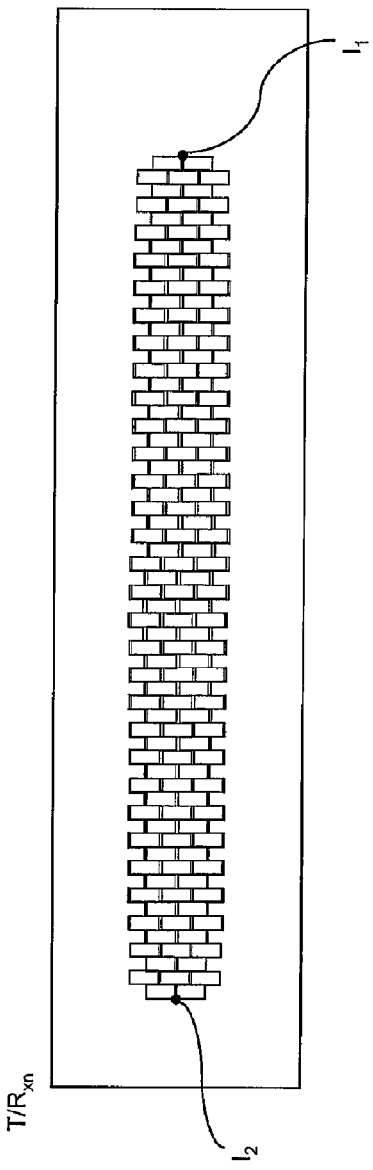
FIG. 2a
FIG. 2b

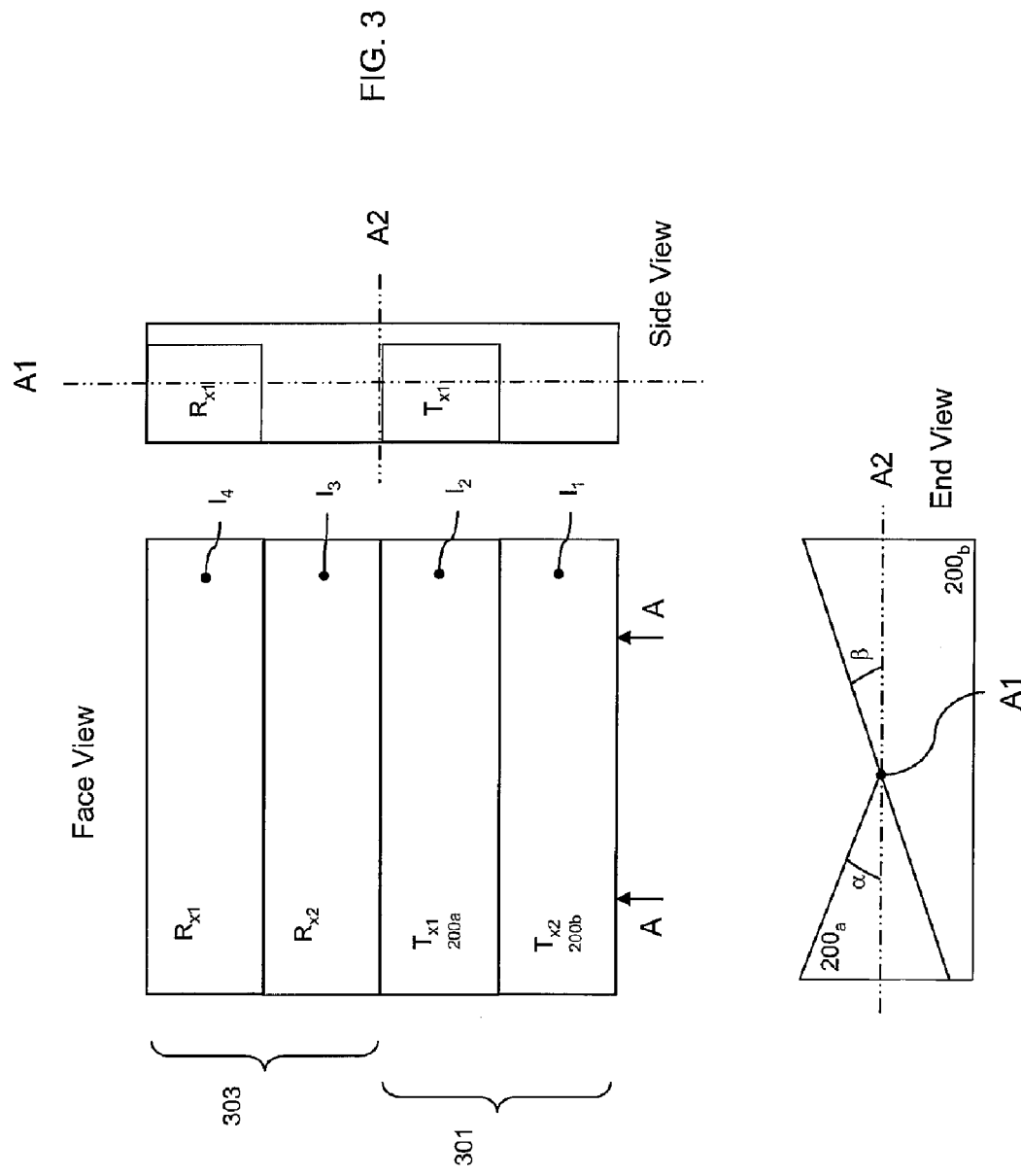

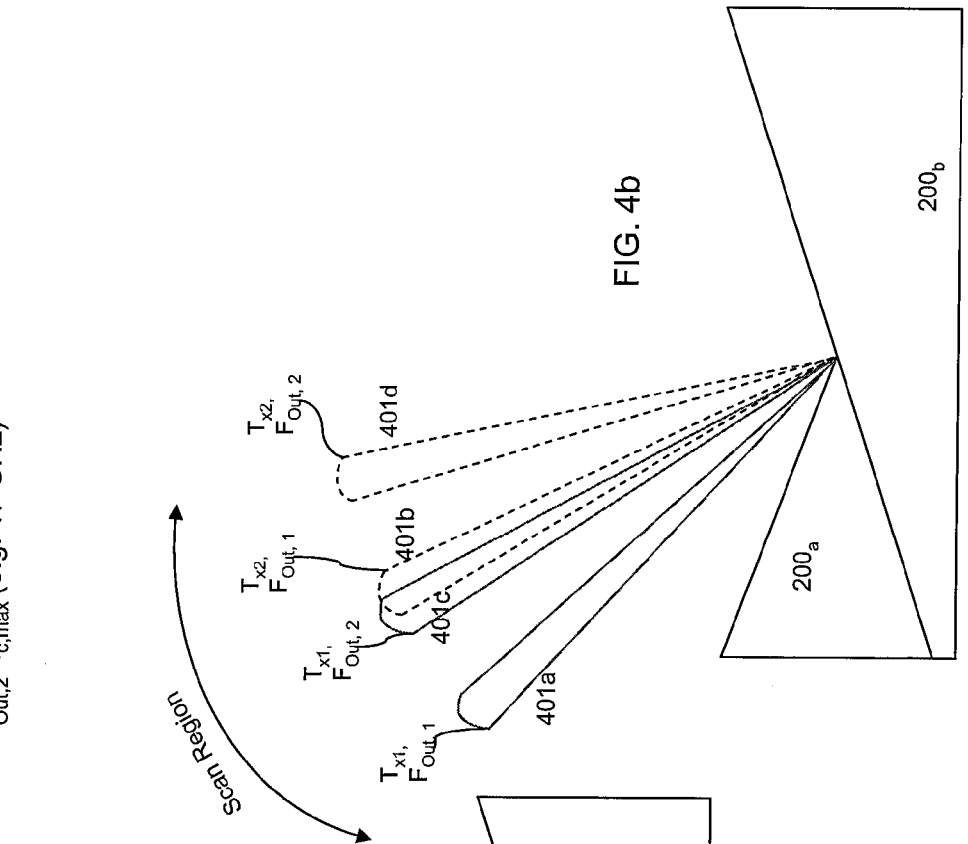
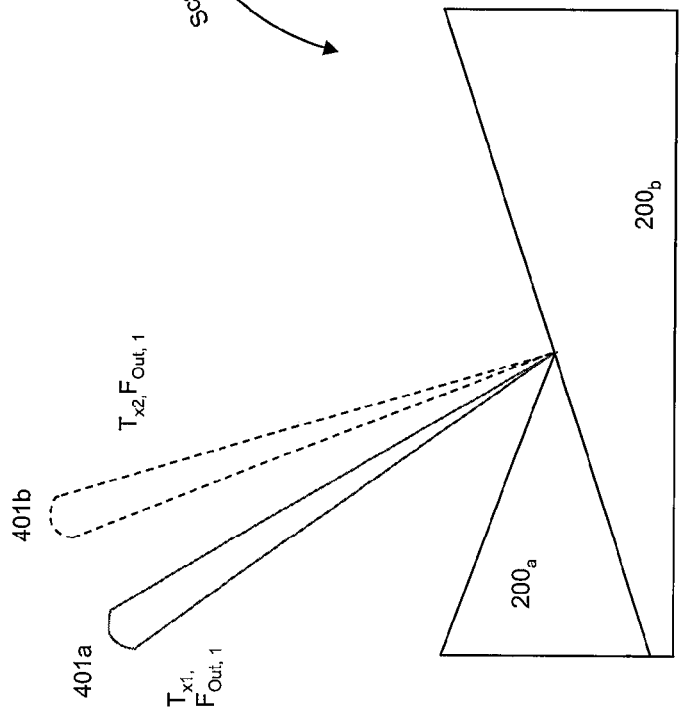
FIG. 4a
FIG. 4b
Views on end A-A

View on end A-A

End View

FREQUENCY SCANNING ANTENNA

CROSS REFERENCE TO RELATED APPLICATIONS

This application claims the benefit of International Patent Application No. PCT/EP2006/068732 filed on Nov. 21, 2006 and entitled "FREQUENCY SCANNING ANTENNA", the contents and teachings of which are hereby incorporated by reference in their entirety.

FIELD OF THE INVENTION

The present invention relates to a frequency scanning antenna, and relates specifically to frequency scanning antennas that are particularly, but not exclusively, suitable for use in detecting and monitoring ground-based targets.

BACKGROUND OF THE INVENTION

Frequency scanning antennas are used in radar systems in order to scan across a given region for the presence of objects. As is known, such frequency scanning arrays can steer a beam in an angular plane in response to input signals of varying frequencies. Particular examples of frequency scanning arrays include the serpentine waveguide, as described in U.S. Pat. No. 4,868,574 and the travelling wave wire antenna, as described in U.S. Pat. No. 3,290,688.

Alternative mechanisms for steering a beam include mechanical devices comprising an antenna that physically moves in space, or phased antenna arrays that are arranged to steer radiation as it is transmitted or received. A problem with the mechanical radar systems is that their operation is reliant on physical components and associated control and moving parts. This inventory of parts is costly and can require a commensurately large power source.

One known group of electronic devices is phased antenna arrays, which apply various phase shifts to signals, thereby effectively steering the received and transmitted beams. These electronic devices are commonly used in RF sensor and communications systems because they do not involve physical motion of the antenna and are capable of moving a beam rapidly from one position to the next. Whilst radar systems incorporating such devices can provide an extremely accurate measure of the position of targets, a problem with these types of electronic devices is that adequate control of the beam requires often several arrays of electronics components; this increases the physical size, complexity and cost of the radar system.

Frequency scanning arrays have been combined with moving parts that rotate in another plane, as described in U.S. Pat. No. 4,868,574. However, a problem with this combination is that it incurs the size and cost shortcomings of regular mechanical scanning system and performance-wise, is less accurate than the phased antenna systems.

SUMMARY OF THE INVENTION

In relation to the frequency scanning antenna, a particularly efficient antenna (in terms of level of complexity—relatively low—and performance—relatively good) is the travelling wave antenna. Application of such a travelling wave antenna is described in U.S. Pat. No. 5,765,098, which describes a single antenna array for transmitting, and a single antenna array for receiving, signals in a satellite system. However, a problem with this type of antenna is that it only radiates over a relatively narrow scan angle as the frequency is changed, this limiting the scan area over which the antenna can be used; such a single antenna array is of course perfectly acceptable for applications such as satellite systems in view of the high altitude, since a relatively modest scan angle translates to a significant angular extent at the point of receipt by the satellites.

According to an aspect of the invention, the inventors have developed a frequency scanning antenna structure for transceiving radio frequency energy and being capable of steering a radio frequency beam to a plurality of different angles about the antenna structure, the antenna structure comprising at least two array antennas and a controller for controlling input of energy to the two array antennas, wherein the array antennas are disposed within the antenna structure such that the antenna structure is capable of steering a beam to a first angle using one of said two array antennas and of steering a beam to a second angle, different to said first angle, using the other of said two array antennas.

Thus in embodiments of the invention two or more array antennas are arranged to form an antenna structure, and the feed to a respective antenna array of the antenna structure is coordinated so that individual scan areas can be combined to generate an increased overall scan region. In one arrangement the antenna structure is arranged to steer a beam across a plurality of non-contiguous angular regions, and in another to steer a beam across a contiguous angular region. Conveniently the antenna structure is capable of steering a beam across a first range of angles (a first angular region) using one of said two array antennas and of steering a beam across a second range of angles (second angular region) using the other of said two array antennas: the first and second angular regions being different, and collectively offering a scan region of an angular extent greater than that achievable with individual antenna arrays.

Conveniently each said array antenna comprises input means for inputting said energy thereto, and the controller is arranged to input energy to respective array antennas so as to steer the beam to said first and second angles. More specifically, each input means is arranged to input energy to respective array antennas so as to steer the beam across said contiguous or non-contiguous angular regions. In one arrangement the input means is connectable to ends of the antenna array and is in operative association with a frequency generator—such as that described above—so as to receive signals comprising radio frequency energy at a plurality of different frequencies in order to steer the beam.

Preferably the controller is arranged to input energy in accordance with a predetermined sequence so as to steer the beam across said first and second angles, the sequence comprising, for example, inputting energy to a first end of the first antenna array, inputting energy to a first end of the second antenna array, inputting energy to a second end of the second antenna array, and inputting energy to a second end of the second antenna array.

In relation to the configuration of the antenna structure itself, the antenna structure can conveniently be characterised in terms of a longitudinal axis and a transverse axis perpendicular to said longitudinal axis: a first of said array antennas being inclined at said first angle relative to said transverse axis and a second of said array antennas being inclined at said second angle relative to said transverse axis. Moreover, the first and second array antennas are symmetrically disposed about the longitudinal axis and each of said array antennas comprises two ends and two side portions. In one arrangement a side portion of said second array antenna substantially abuts a side portion of said first array antenna, while in another arrangement an end portion of the second array antenna substantially abuts that of the first array antenna. The extent of the scan region is dependent on the physical relationship between the two array antennas, more specifically on the angle each respective array antenna makes to the transverse axis. In one arrangement the angular extent of the radar system is substantially 80 degrees, but other angles are possible, ranging from 60 degrees, 100 degrees, 120 degrees, consistent with various arrangements of the antenna arrays within the antenna structure. Furthermore the antenna structure can be configured so as to include more than two array antennas, thereby further increasing the angular extent of the radar system.

In one arrangement, each of the array antennas comprises a mesh structure and a dielectric base. Each mesh structure can comprise a plurality of interconnected elements embodied as a micro circuit strip (commonly called a microstrip) and can conveniently be disposed on a surface of a corresponding said dielectric base, which in turn is supported by a ground plane.

The mesh structure can conveniently be characterised by the lengths of respective sides and ends of the elements: each of said elements comprising two sides and two ends of respective lengths, the length of said sides being greater than the length of said ends. Typically the length of the sides is of the order of one wavelength at a mid-point between said first frequency and said second frequency and the length of the ends is of the order of one-half of one wavelength at said mid-point frequency. Each mesh element has a characteristic width, and in a preferred arrangement the mesh widths of the sides are progressively decreased from the centre of the mesh to each respective end thereof. Since impedance is inversely proportional to mesh width, it will be appreciated that this provides a convenient means of controlling the impedance of the antenna array elements and thus the resulting radiation pattern.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2a is a schematic diagram showing an embodiment of an antenna array utilised in the antenna shown in FIG. 1;

FIG. 2b is a schematic diagram showing another embodiment of an antenna array utilised in the antenna shown in FIG. 1;

FIG. 3 is a schematic engineering drawing showing an antenna structure comprising the antenna array of FIG. 2a use in the radar system shown in FIG. 1;

FIG. 4a is a schematic diagram showing radiation emitted from the antenna structure of FIG. 3 for a given output frequency;

FIG. 4b is a schematic diagram showing radiation emitted from the antenna structure of FIG. 3 for a given output frequency;

Figure 1:
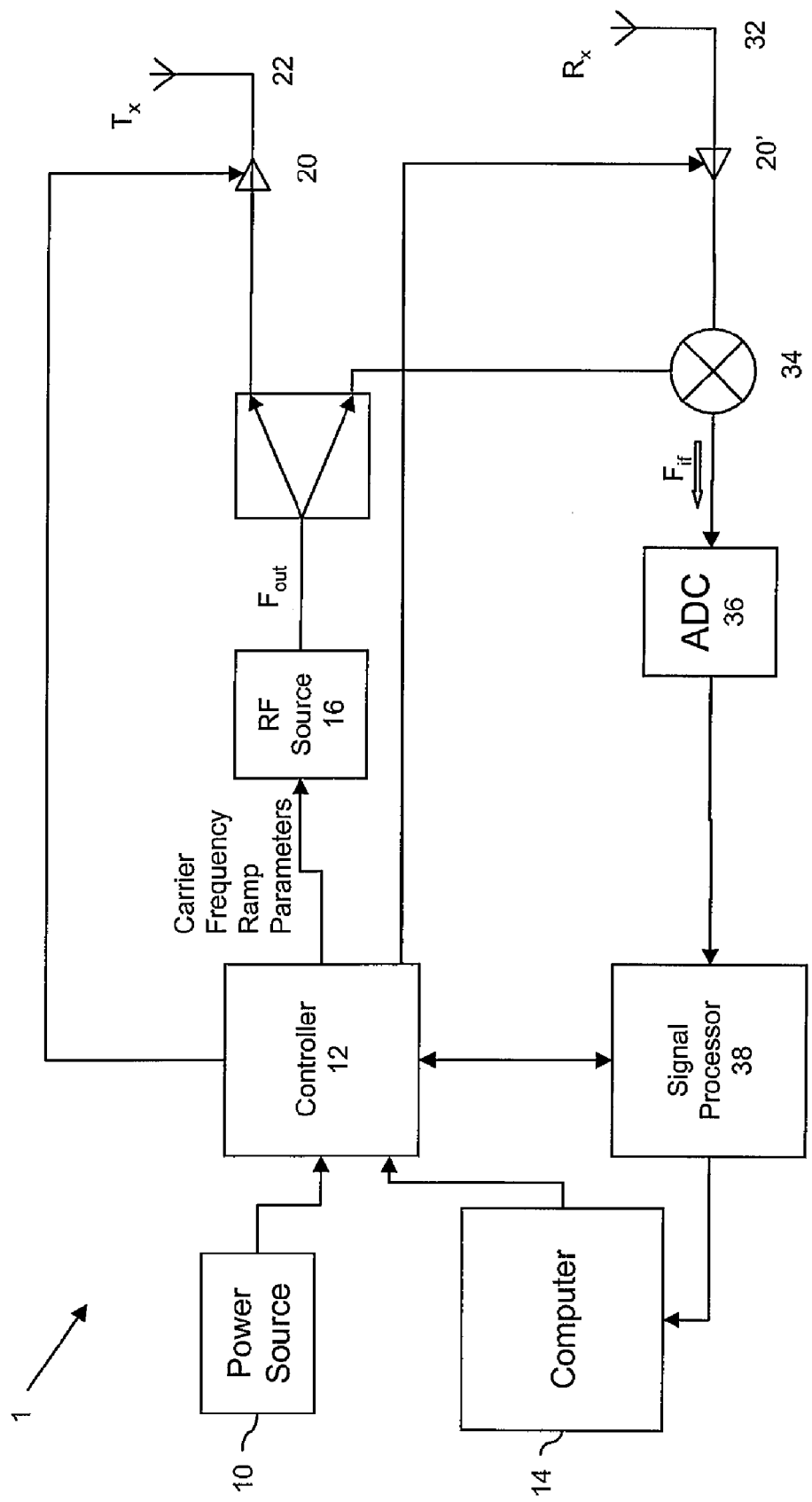
FIG. 1 is a schematic block diagram showing components of a radar system according to embodiments of the invention.

Several parts and components of the invention appear in more than one Figure; for the sake of clarity the same reference numeral will be used to refer to the same part and component in all of the Figures. In addition, certain parts are referenced by means of a number and one or more suffixes, indicating that the part comprises a sequence of elements (each suffix indicating an individual element in the sequence). For clarity, when there is a reference to the sequence per se the suffix is omitted, but when there is a reference to individual elements within the sequence the suffix is included.

DETAILED DESCRIPTION OF THE INVENTION

FIG. 1 shows a radar system 1 within which embodiments of the invention operate, the radar system 1 comprising a power source 10, a controller 12, and a computer 14, the power source and computer 10, 14 being arranged to provide power to, and operational control over, the controller 12. The controller 12 comprises a microprocessor and a set of instructions (not shown) for execution thereby, effectively generating control signals that cause the RF frequency source, or signal generator 16, to output RF energy at a specified frequency $F_{OUT}$, and this output signal, under control of amplifiers 20, drives antenna 22. As will be described in more detail below, the RF frequency source 16 generates signals within a range of frequencies, causing the antenna 22 to transmit beams in different angular directions, thereby scanning over a region beyond the radar system 1.

The radar system 1 also includes a receiving antenna 32, which receives radiated signals reflected back from objects, and passes the received radiation through amplifier components 20' to mixer 34. The mixer 34 comprises two inputs: a first connected to the RF source 16; and a second connected to the receiving antenna 32. The output of the mixer 34 is fed to an Analogue to Digital converter ADC 36, to produce a digitised signal for input to the signal processor 38, which performs analysis of the received signal. The signal processor 38 performs a spectral analysis on the received signals, because the range between the radar system and external (reflecting) objects is contained as frequency information in the signal.

It will be appreciated from the foregoing that the antennas 22, 32 transmit and receive radiation in response to input signals of varying frequencies; accordingly the antennas 22, 32 are of the frequency scanning antenna type. In a preferred embodiment, the frequency scanning antenna is embodied as a travelling wave antenna structure comprising at least two array antennas, one such antenna array 200 being shown in FIG. 2a. In one arrangement, the antenna array comprises a mesh structure 201 and a dielectric base 203 and has input means 207 for inputting energy to the mesh structure 201. The input means 207 can comprise coaxial feeds positioned orthogonal to the plane of the antenna array 200, but the skilled person will appreciate that alternative feeds could be used.

In the arrangement shown in FIG. 2a, each mesh structure 201 comprises a plurality of rectangular interconnected elements 209 that are disposed on a surface of the dielectric base 203, the dielectric base 203 being supported on a ground plane. Each rectangular element 209 comprises two sides 213a, 213b and two ends 211a, 211b, the length L of the sides 213a, 213b being greater than the length S of the ends 211a, 211b. The physics underlying the operation of the travelling wave antenna are well known, having first been investigated by John Kraus and described in U.S. Pat. No. 3,290,688.

Suffice to say that the length L of the sides 213 is of the order of one wavelength of the mean carrier frequencies, and the length S of the ends 211 is of the order one half of the wavelength of the mean carrier frequencies. It will be appreciated from the teaching in U.S. Pat. No. 3,290,688 that mesh configurations other than rectangular and planar can be used.

In relation to the particular configuration adopted for embodiments of the invention, when current is fed through the mesh structure 201 via feed 207, currents passing through the ends 211a, 211b are in phase with one another. The current flowing through a respective side 213a of a given element 209 is received from an end 211a of an adjacent element (shown as input 217) and splits into two current flows, each flowing in a different direction and being out of phase with one another. As is also shown in FIG. 2a, the width of the mesh making up sides 213a, 213b is progressively decreased from the centre of the mesh to each respective end thereof, thereby effectively increasing the length of the sides 213a, 213b from the centre of the array towards its ends. In a preferred arrangement the antenna can be embodied as a micro circuit strip.

The configuration of the antenna structure 301 according to an embodiment of the invention will now be described with reference to FIGS. 3 and 4. FIG. 3 shows a development of the radar system 1 shown in FIG. 1, including two antennas each embodied in the form of antenna array 200a, 200b shown in FIGS. 2a and 2b, and the antenna structure 301 is responsive to input from the controller 12 for controlling input of energy to respective feeds $I_1$, $I_2$ of the antenna arrays 200a, 200b. Referring also to FIG. 4a, the two planar array antennas 200a, 200b are disposed within the structure 301 such that, for any given radio frequency, the antenna structure 301 is capable of transmitting the radio frequency energy within different angular regions 401a, 401b.

Referring back to FIG. 3, the antenna structure 301 can be characterised by a longitudinal axis A1 and a transverse axis A2, which provides a convenient frame of reference for describing the arrangement of the planar antenna arrays 200a, 200b. As can be seen from FIG. 3, the first array antenna 200a is inclined at an angle α relative to said transverse axis A2 and the second planar array antenna 200b is inclined at angle β relative to the transverse axis A2. As can also be seen from the Figure, a side portion of said second array antenna 200b abuts a side portion of said first array antenna 200a (in the Figure the side portions are located on the dot indicating axis A1) such that when viewed face on, the antenna arrays 200b are located in adjacent longitudinal planes.

It will be appreciated from the schematic shown in FIG. 4a that the orientation of the respective antenna arrays 200a, 200b-that is to say angles α and β-determine the direction in which radiation is emitted from the antenna structure 301. Thus, by varying the relative positions of the respective antenna arrays 200a, 200b, different portions of an angular region can be scanned for a given output frequency, $f_{OUT,1}$.

FIG. 4b shows radiation emitted 401a-401d from the antenna arrays for two different output frequencies $f_{OUT,1}$ and $f_{OUT,2}$, and it can be seen that appropriate selection of the values of $f_{OUT,1}$ and $f_{OUT,2}$, results in the antenna structure 301 outputting radiation so as to cover a substantially contiguous region, thereby scanning over a greater angular region than is possible with a single antenna array, or even two arrays that are positioned in the same plane, such as that described in U.S. Pat. No. 4,376,938.

Figure 5:
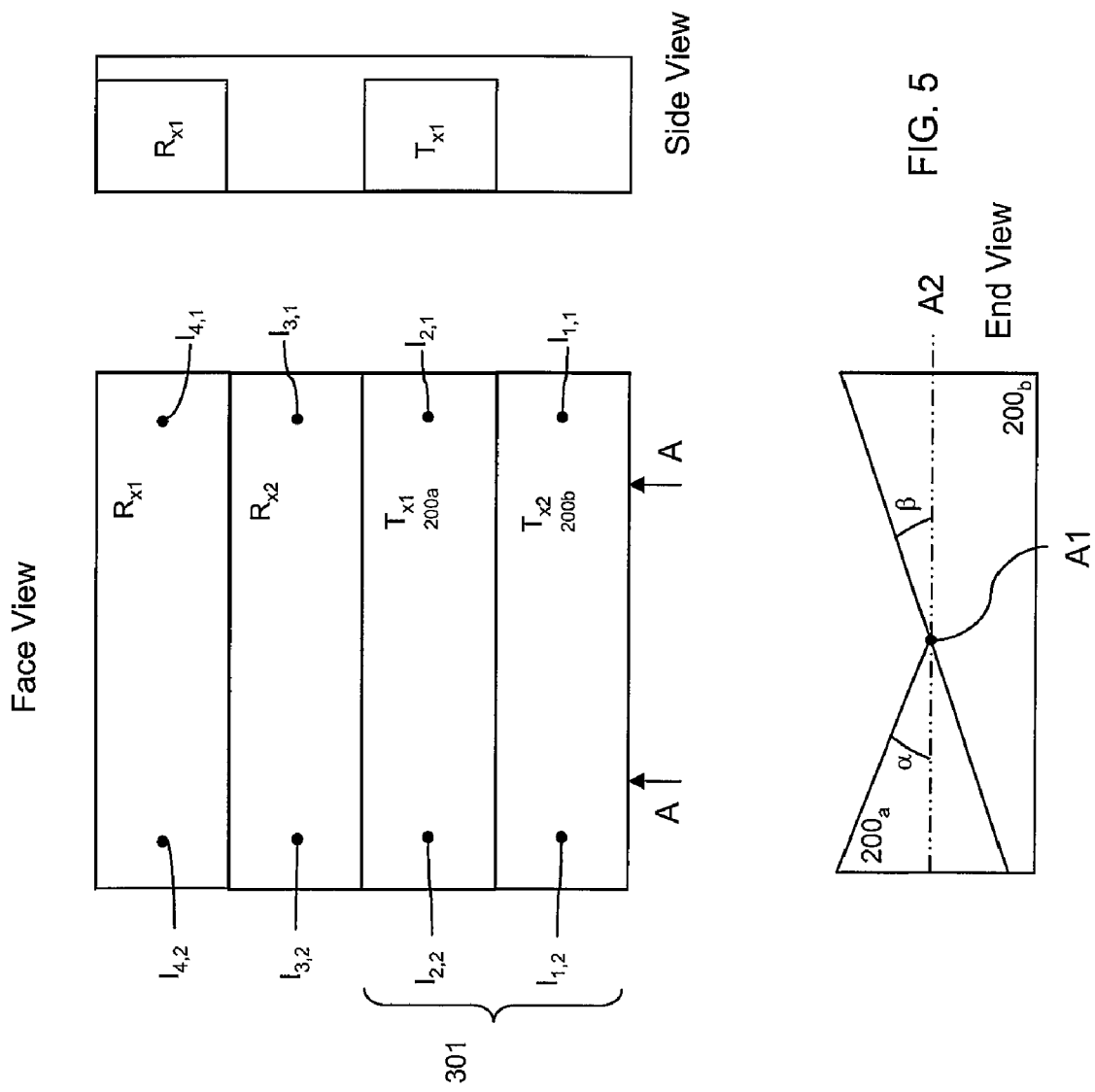
FIG. 5 is a schematic engineering drawing showing an antenna structure comprising the antenna array of FIG. 2b for use in the radar system shown in FIG. 1.
Figure 6:
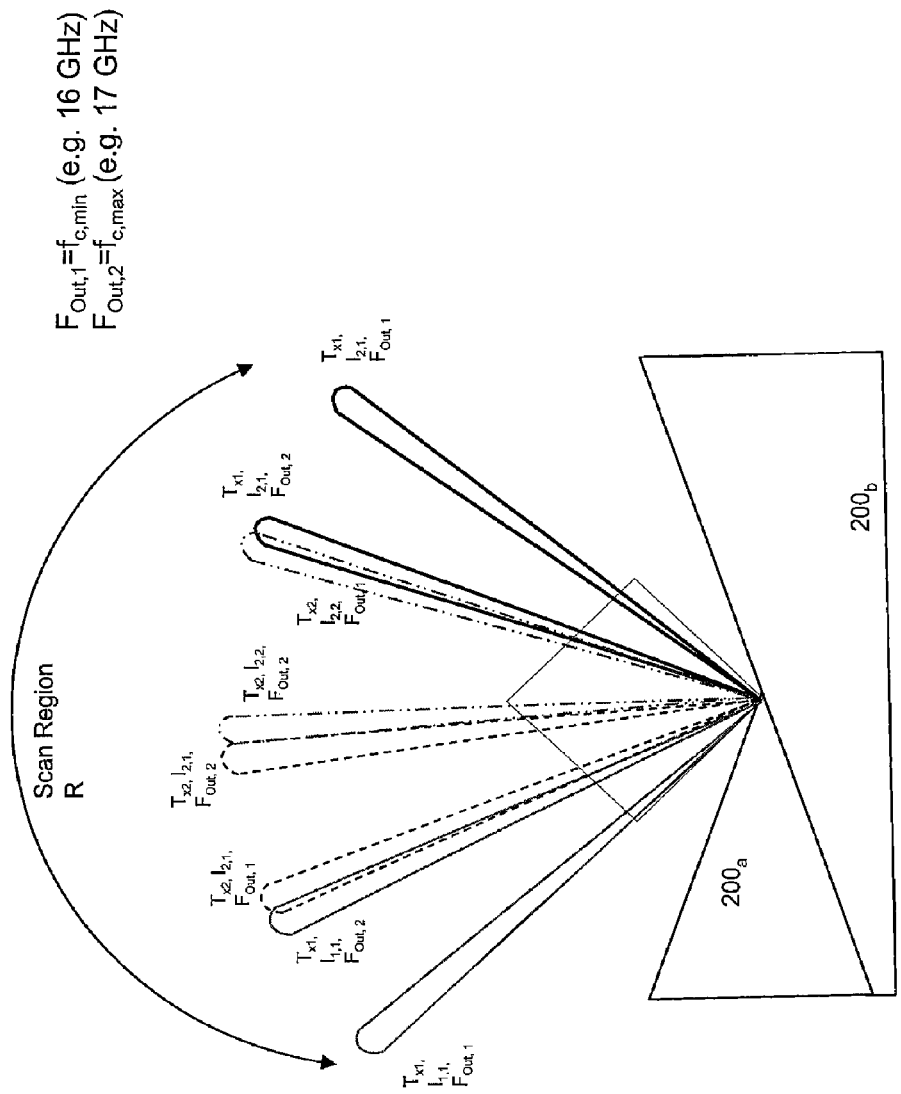
FIG. 6 is a schematic diagram showing radiation emitted from the antenna structure of FIG. 5.

The arrangements shown in FIGS. 2a, 3, 4a and 4b relate to an arrangement in which the antenna arrays 200a, 200b comprise a single feed $I_1$, $I_2$ at one end of respective antenna arrays. However, and referring to FIGS. 2b and 5, each antenna array could comprise an additional feed at its other end ($I_{1,2}$, $I_{2,2}$). Each antenna 22a, 22b can then be considered to be capable of emitting radiation in two directions for a given frequency $f_{OUT}$, since the transceive-behaviour of the antenna array 200a is dependent on the direction from which energy is fed into the antenna. Turning to FIG. 6, it can be seen that by feeding energy to two input feed points for each antenna array, the region R within which radiation can be transceived is effectively doubled.

Figure 7:
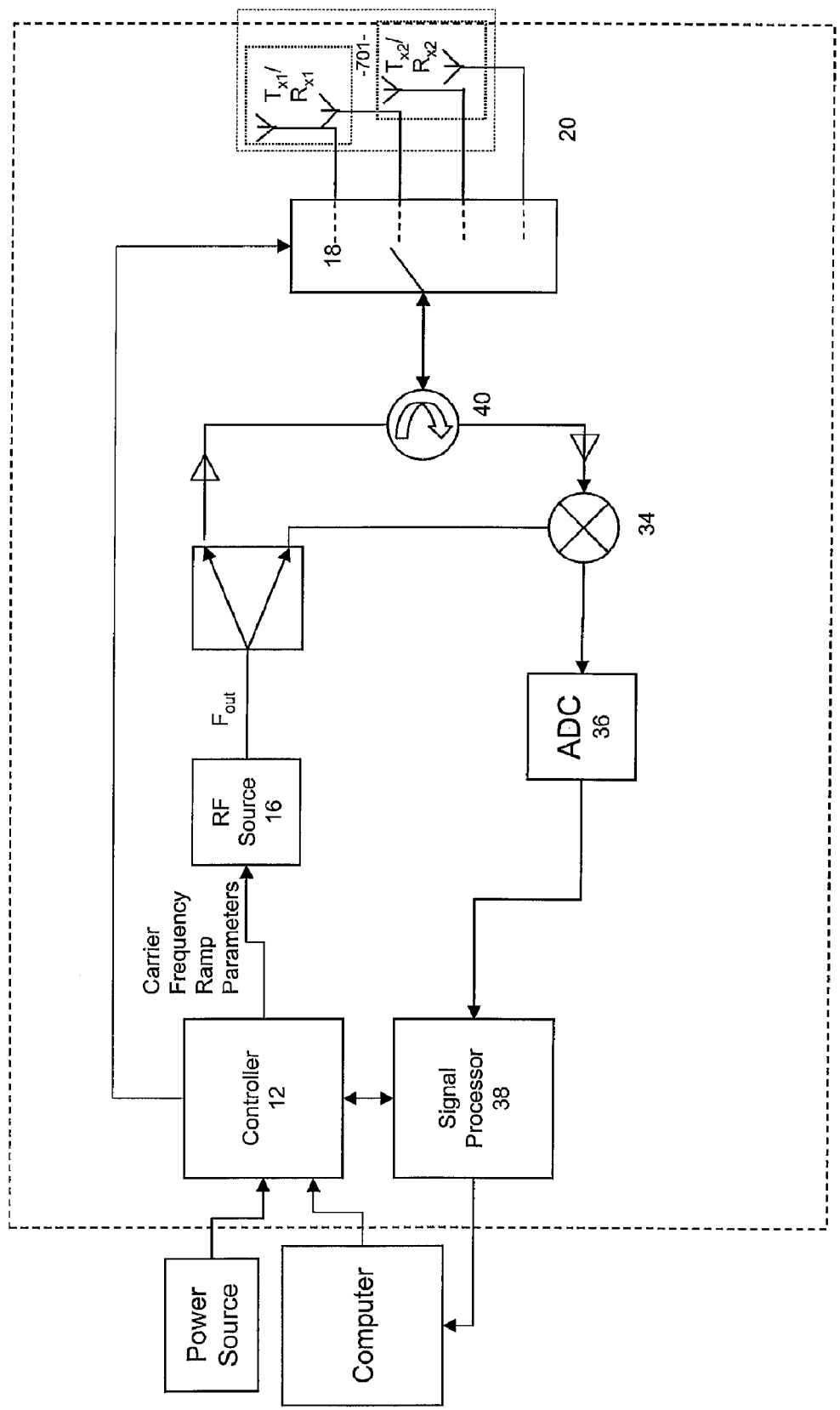
FIG. 7 is a schematic block diagram showing components of a radar system according to a yet different embodiment of the invention.

In the above passages the radar system 1 is assumed to comprise a separate transmit and receive antenna structure 301, 303. However, and turning to FIG. 7, the radar system 1 could alternatively comprise a single antenna structure 301 and a circulator 40, which, as is known in the art effectively combines signals that are transmitted and received from the antenna structure 301.

Figure 8:
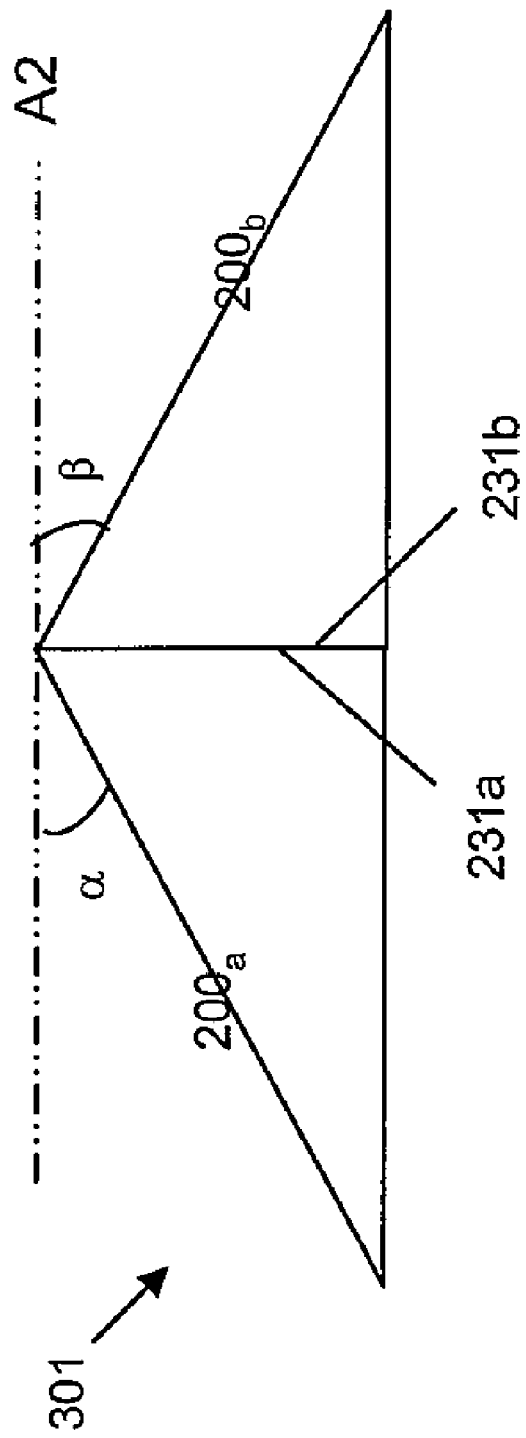
FIG. 8 is a schematic engineering drawing showing an alternative antenna structure comprising the antenna arrays of FIG. 2a or 2b for use in the radar system shown in FIG. 1.

FIG. 8 shows an alternative configuration of the antenna arrays 200a, 200b within an antenna structure 301, in which each the antenna array 200a, 200b is located on a respective support structure, an outer edge 231a of one support structure abutting a corresponding outer edge 231b of another support structure so as to form an antenna structure having a generally isosceles shape; since the supports of respective antenna arrays abut one another the radar system can be fabricated such that receiving antenna structure 301 abuts transmitting antenna structure 303, thereby generating a physically smaller radar system, in terms of depth occupied by the antenna structure, compared to that shown in FIG. 3. It will be appreciated that other configurations are possible, involving two, three or several such antenna arrays mounted on suitable support structures.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A frequency scanning antenna structure for a radar system, the antenna structure being capable of steering a radio frequency beam to a plurality of different angles about the antenna structure across a substantially contiguous angular region, the antenna structure comprising first and second travelling wave antennas and a controller for controlling input of radio frequency energy to the two travelling wave antennas and for controlling a frequency of the radio frequency energy, wherein the controller is arranged to:
input the radio frequency energy to the first travelling wave antenna and to control the frequency of said radio frequency energy such that the antenna structure is capable of steering the beam across a first part of the angular region, and
input the radio frequency energy to the second travelling wave antenna and to control the frequency of said radio frequency energy such that the antenna structure is capable of steering the beam across a second part of the angular region, and
input the radio frequency energy to the first travelling wave antenna and to control the frequency of said radio frequency energy such that the antenna structure is capable of steering the beam across a third part of the angular region, wherein the first and second travelling wave antennas are disposed within the antenna structure such that, in use, the second part of the angular region is positioned between the first and third parts of the angular region.

2. A frequency scanning antenna structure according to claim 1, wherein the antenna structure is capable of steering a beam across a plurality of non-contiguous angular regions.

3. A frequency scanning antenna structure according to claim 1, wherein the antenna structure is capable of steering a beam across a first range of angles using one of said two travelling wave antennas and of steering a beam across a second range of angles using the other of said two travelling wave antennas.

4. A frequency scanning antenna structure according to claim 3, wherein a first angular region is defined by said first range of angles.

5. A frequency scanning antenna structure according to claim 3, wherein a second angular region is defined by said second range of angles.

6. A frequency scanning antenna structure according to claim 3, wherein said first range of angles is different from said second range of angles.

7. A frequency scanning antenna structure according to claim 1, wherein the substantially contiguous angular region is substantially 80 degrees.

8. A frequency scanning antenna structure according to claim 1, wherein each said travelling wave antenna comprises input means for inputting said radio frequency energy thereto.

9. A frequency scanning antenna structure according to claim 8, wherein each input means is arranged to input energy to respective travelling wave antennas so as to steer the beam across said substantially contiguous angular region.

10. A frequency scanning antenna structure according to claim 1, wherein each said travelling wave antenna comprises input means for inputting said energy thereto and wherein, for a given travelling wave antenna, the input means is arranged to input energy to the travelling wave antenna at two locations so as to steer the beam across said angular region.

11. A frequency scanning antenna structure according to claim 8, wherein the input means of each said travelling wave antenna is connectable to ends of each said travelling wave antenna.

12. A frequency scanning antenna structure according to claim 8, wherein the input means is arranged in operative association with a signal generator so as to receive signals comprising radio frequency energy at a plurality of different frequencies so as to steer the beam.

13. A frequency scanning antenna structure according to claim 8, wherein the controller is arranged to input energy in accordance with a predetermined sequence so as to steer the beam across said substantially contiguous angular region.

14. A frequency scanning antenna structure according to claim 13, wherein the predetermined sequence includes inputting energy to a first end of the first travelling wave antenna, inputting energy to a first end of the second travelling wave antenna, and inputting energy to a second end of the second travelling wave antenna.

15. A frequency scanning antenna structure according to claim 1, said antenna structure having a longitudinal axis and a transverse axis perpendicular to said longitudinal axis, wherein the first of said travelling wave antennas is inclined at a first angle relative to said transverse axis and the second of said travelling wave antennas is inclined at a second angle relative to said transverse axis, said second angle different from said first angle.

16. A frequency scanning antenna structure according to claim 15, wherein each of said travelling wave antennas comprises two ends and two side portions, a side portion of said second travelling wave antenna substantially abutting a side portion of said first travelling wave antenna.

17. A frequency scanning antenna structure according to claim 15, wherein the first and second travelling wave antennas are symmetrically disposed about the longitudinal axis.

18. A frequency scanning antenna structure according to claim 1, each said travelling wave antenna comprising a mesh structure and a dielectric base.

19. A frequency scanning antenna structure according to claim 18, each mesh structure comprising a plurality of interconnected elements and being disposed on a surface of a corresponding said dielectric base.

20. A frequency scanning antenna structure according to claim 19, wherein each of said elements comprises two sides and two ends of respective lengths, the length of said sides being greater than the length of said ends, wherein the length of the sides is of the order of one wavelength at a midpoint frequency between a first frequency and a second frequency and the length of the ends is of the order one-half of one wavelength at said mid-point frequency.

21. A frequency scanning antenna structure according to claim 19, sides of each element having a width, wherein the width of the sides is progressively decreased from the center of the mesh to each respective end thereof, so as to control the impedance of the travelling wave antenna.

22. A frequency scanning antenna structure according to claim 19, wherein each said element in the mesh structure comprises a rectangular element.

23. A frequency scanning antenna structure according to claim 1, wherein each said travelling wave antenna comprises a planar array antenna.

24. A frequency scanning antenna structure according to claim 1, wherein each said travelling wave antenna comprises a micro circuit strip.

* * * * *